Patented Nov. 23, 1948

2,454,453

UNITED STATES PATENT OFFICE 2,454,453

PIGMENT GREEN AND PROCESS FOR PRODUCING THE SAME

William G. Huey, Nassau, and Walter G. Drautz, Glenmont, N. Y., assignors to General Aniline & Film Corporation, New York, N. Y., a corporation of Delaware No Drawing. Application December 28, 1945, Serial No. 637,784

6 Claims. (Cl. 106—304)

1

This invention relates to the production of improved pigment green, i. e., iron complexes of nitroso-β-naphthol and the products thereof having improved texture characteristics and excellent working properties and tinctorial strength.

The production of pigment comprising the iron complex of nitroso-β-naphthol is well known in the art, a particularly useful method being disclosed in United States Patent No. 1,529,891 for producing a pigment color of this character which has a brilliant green hue and is known commercially as "Pigment Green." In accordance with this preferred method of producing the iron complex of nitroso-β-naphthol, the nitroso-β-naphthol, preferably in the form of its bisulfite compound, is reacted with iron salts, particularly ferric chloride. This treatment may be conducted in the presence or absence of substrates at ordinary or elevated temperatures. The resultant product exhibits good fastness towards light and alkalies but is relatively hard in texture and very difficult to disperse. This hardness characteristic is especially pronounced in instances where the pigment paste is permitted to dry out during processing, such dry product becoming almost impossible to soften and disperse. Accordingly, the use of pigment green has been largely restricted to those applications in which it is possible to employ aqueous pigment paste, although other methods have been suggested for improving the texture properties of pigment green, for example, the incorporation of insoluble salts of dispersing agents as disclosed in United States Patent No. 2,092,750 or treatment of the material with colorless organic amines, as disclosed in United States Patent No. 2,259,641. The dried pigment cakes which have heretofore been obtained have a hard, shiny surface and are sufficiently hard that they finally have to be ground.

We have discovered that if a small definite amount of water-immiscible liquid is introduced, in the manner hereinafter described, into a solution of nitroso-β-naphthol during the course of production of pigment green, a dried pigment cake is produced which falls apart at the merest touch and which also has markedly increased tinctorial strength.

The general method of preparing pigment green in accordance with the present invention involves the introduction of small amounts of water-immiscible liquids of the class of higher saturated and unsaturated aliphatic alcohols, fatty oils and viscous mineral oils into a solution of nitroso-β-naphthol, preferably in the form of its bisulfite or nitrite compound. The aqueous mixture is then treated with an iron salt, preferably ferrous sulfate and finally precipitated with a solution of sodium carbonate to form the insoluble green pigment. While the water-immiscible liquid employed in the present invention may advantageously be added before the treatment with iron salt, satisfactory results are obtained by adding this water immiscible liquid at any time before precipitation of the pigment.

In order for an improved pigment to be obtained, the amount of water-immiscible liquid which is incorporated in the reaction mixture must fall within the range of from 1 to 13% by weight, based on the weight of nitroso-β-naphthol, and for maximum improvement in properties of the pigment, an addition in the range of from 2 to 6% by weight of water-immiscible liquid is preferred.

As examples of suitable water-immiscible liquids for use in practicing the present invention may be mentioned higher saturated and unsaturated aliphatic alcohols such as cetyl alcohol, oleyl alcohol, octadecyl alcohol and mixtures of such alcohols, such as commercial mixtures of $C_{16}$ and $C_{18}$ unsaturated alcohols sold under the name of Ocenol, or other water-immiscible liquid alcohols. Various fatty oils, such as linseed oil, cottonseed oil, olive oil, and similar fatty oils are also satisfactory for use in the present invention. Likewise, mineral oils, particularly viscous mineral oil of the type of white medicinal mineral oils, may be employed in practicing the present invention. The particular water-immiscible liquid which is employed may depend to some extent on the art in which the pigment which is to be produced is employed.

The following examples illustrate the invention:

Example 1

19 parts of nitroso-β-naphthol was solubilized in aqueous solution with about 20 parts of sodium bisulfite. The mixture was then filtered and treated with about 0.75 part of cottonseed oil. The mixture was thoroughly agitated and 9.5 parts of ferrous sulfate crystals was then added. The pigment was precipitated by the addition of dilute sodium carbonate solution in the usual way until the test is alkaline to Brilliant Yellow paper. The priciptated pigment was filtered and washed until neutral and then dried.

Example 2

The pigment was prepared as in Example 1 but .75 part of cetyl alcohol was substituted for the cottonseed oil. The pigment obtained was soft and suitable for working in rubber and rubber compounds and similar in properties to that obtained in Example 1.

*Example 3*

The pigment was prepared as in Example 1 but 0.75 part of Ocenol was substituted for the cottonseed oil. The dried pigment powder obtained was substantially identical with that obtained in Examples 1 and 2.

*Example 4*

19 parts of nitrosol-β-naphthol was solubilized in aqueous solution with about 20 parts of sodium bisulfite. The mixture was then filtered and 9.5 parts of ferrous sulfate crystals were then added and thereafter, while the mixture was thoroughly agitated, 0.75 part of cottonseed oil was added and the agitation continued for about 30 minutes. The pigment was then precipitated by the addition of dilute sodium carbonate solution in the usual way until the test was alkaline to Brilliant Yellow paper, and the precipitated pigment then filtered and washed until neutral, and the cake was then dried.

The dried pigment cake obtained in each of the foregoing examples had a dull sheen and fell apart on mere touch in contrast to the dried cake resulting from untreated pigment green or pigment green treated with other agents, which cakes may have a hard surface and are sufficiently hard that they have to be ground. This soft chalky material is of particular value for coloring rubber and rubber compounds, either natural or synthetic, as it incorporates more uniformly with rubber, gives a greater surface area exposure, thus giving a marked increase in tinctorial strength, together with a desirable improvement in shade and shortening of the milling process. The use of these treated pigments is not limited, however, to coloring rubber, since they are broadly applicable for use in compositions in which a dried pigment powder is desired. Thus, they may be employed in coloring such products as oil, coating compositions (paints and enamels) and the like. It will be understood that the foregoing examples illustrate preferred embodiments of the present invention and that various modifications may be made therein by those skilled in the art. In particular, it should be noted that other salts of nitroso-β-naphthol may be used, for example, the nitrite; and other iron compounds may be used, for example, ferric chloride or ferrous oxalate. The amount of ferrous sulfate or other iron salt employed may be varied somewhat from that given in the examples, but usually is not in excess of 1 mole of iron to 3 mols of nitroso-β-naphthol.

We claim:

1. In a process for producing the iron complex of nitroso-β-naphthol wherein a salt of nitroso-β-naphthol is reacted with an iron salt and the thus-obtained iron complex of nitroso-β-naphthol is precipitated, the improvement which comprises incorporating in the reaction mixture before precipitation of the pigment, from 2-6% of a water immiscible oleaginous liquid, and thereafter precipitating said iron complex, in the absence of dispersing agents and insoluble substrates, and recovering and drying the same.

2. In a process for producing the iron complex of nitroso-β-naphthol wherein a salt of nitroso-β-naphthol is reacted with an iron salt and the thus-obtained iron complex of nitroso-β-naphthol is precipitated, the improvement which comprises incorporating in the reaction mixture before precipitation of the pigment, from 2-6% of a mixture of unsaturated alcohols largely containing 16 to 18 carbon atoms, and thereafter precipitating said iron complex, in the absence of dispersing agents and insoluble substrates, and recovering and drying the same.

3. In a process for producing the iron complex of nitroso-β-naphthol wherein a salt of nitroso-β-naphthol is reacted with an iron salt and the thus-obtained iron complex of nitroso-β-naphthol is precipitated, the improvement which comprises incorporating in the reaction mixture before precipitation of the pigment, from 2-6% of cottonseed oil, and thereafter precipitating said iron complex, in the absence of dispersing agents and insoluble substrates, and recovering and drying the same.

4. The soft green pigment consisting essentially of an intimate mixture of the iron complex of nitroso-β-naphthol and from 2-6% of a water-immiscible oleaginous liquid and free of dispersing agents and insoluble substrates.

5. The soft green pigment consisting essentially of an intimate mixture of the iron complex of nitroso-β-naphthol and from 2-6% of unsaturated alcohols composed essentially of alcohols containing 16 to 18 carbon atoms and free of dispersing agents and insoluble substrates.

6. The soft green pigment consisting essentially of an intimate mixture of the iron complex of nitroso-β-naphthol and from 2-6% of cottonseed oil and free of dispersing agents and insoluble substrates.

WILLIAM G. HUEY.
WALTER G. DRAUTZ.

REFERENCES CITED

The following references are of record in the file of this patent:

UNITED STATES PATENTS

| Number | Name | Date |
|---|---|---|
| 2,092,750 | Brizzolara | Sept. 14, 1937 |
| 1,813,371 | Whatmough | July 7, 1931 |

FOREIGN PATENTS

| Number | Country | Date |
|---|---|---|
| 438,192 | Great Britain | Nov. 8, 1935 |